J. F. WAIT.
FILTER.
APPLICATION FILED AUG. 30, 1917.

1,331,732.

Patented Feb. 24, 1920.
2 SHEETS—SHEET 1.

Inventor:
Justin F. Wait
by Wm Macomber
Atty.

UNITED STATES PATENT OFFICE.

JUSTIN F. WAIT, OF NIAGARA FALLS, NEW YORK.

FILTER.

1,331,732.  Specification of Letters Patent.  Patented Feb. 24, 1920.

Application filed August 30, 1917. Serial No. 189,032.

*To all whom it may concern:*

Be it known that I, JUSTIN F. WAIT, a citizen of the United States, residing at Niagara Falls, in the county of Niagara and State of New York, have invented a new and useful Filter, of which the following is a specification.

This invention relates to filters, and more specifically to improvements in apparatus for colloidal filtration or ultrafiltration. I shall use the terms ultrafilter and ultrafiltration as designating broadly the apparatus and process in question.

Without entering upon the technical and not fully established theories of ultrafiltration, or attempting to assert that the action in a membrane or colloidal filter is intramolecular or capillary in character, and without limiting myself by any theory or assumed law, I state the main objects of my invention to be:

First, to provide a membrane, natural or artificial, with supporting means which will prevent any substantial physical change or displacement of the membrane even under high pressures, both for laboratory and commercial purposes. Second, to provide membrane support-means which will prevent any substantial structural displacement while in contact, whether the apparatus be used with or without positive or negative pressure or differential pressures. Third, to provide means whereby pressure, positive or negative, or differential, as hereafter described, may be applied to the membrane. Fourth, to provide means whereby, with any of the aforesaid pressure conditions, the normal viscosity of a given substance may be varied by the application of heat. Fifth, by the application of pressure, to provide means whereby, when heat is so used to change the normal viscosity, the disperse medium or filtrate will not vaporize on passing through the membrane. Sixth, to provide in an ultrafilter employing a plurality of filter units, means whereby the action of each membrane may be observed or examined during the operation and whereby any unit may be cut out of operation without interruption of the operation of the filter. Seventh, to provide means whereby a given substance may be subjected to primary filtration and then, before any physical or chemical change occurs, be subjected to ultrafiltration.

These and other objects and improvements will be evident to one skilled in the art and from the following specifications and claims and from the drawings, which latter are illustrative and diagrammatic, and so to be understood, and not limiting the scope of my invention.

Figure 1:
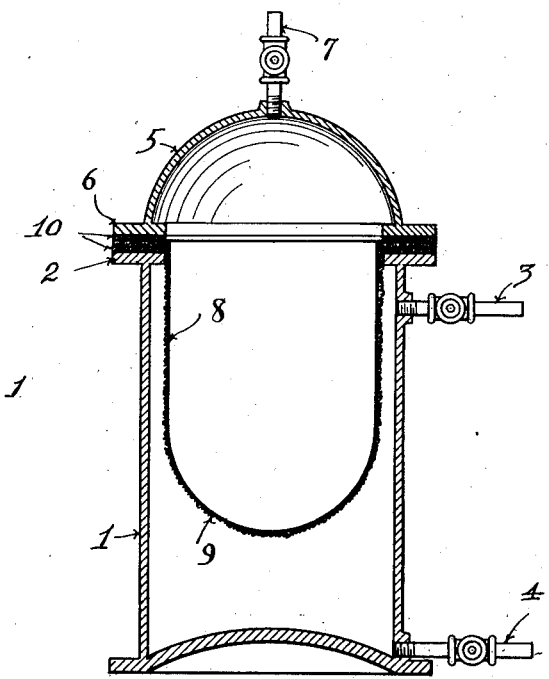
Figure 1 is a vertical, central section of my invention especially adapted to laboratory or quantitative work.

I will first describe certain applications of my invention to an ultrafilter adapted to laboratory or quantitative work, referring especially to Fig. 1.

In prior practice, it has been customary to suspend a colloidal membrane over or within a receptacle, putting into it a specific amount of substance, and awaiting the long, slow process of ultrafiltration under normal gravity conditions. In some cases a flat membrane has been used and has been placed over a support solid and impervious in character and provided with discharge openings, or a corrugated or other coarse support provided. In all constructions heretofore used and known to me, such supports have been wholly inadequate to prevent bending, displacement, or even partial rupture of the membrane, resulting in physical change of the membrane and consequent poor ultrafiltration. And I believe I am the first to discover that even a very slight bending or displacement of the membrane results in a distinct variation of the character of the disperse medium or filtrate, or at least that I am the first to discover and provide means for preventing the same.

In my construction, 1 represents a receptacle, preferably cylindrical in form, provided with flanges 2 at its upper periphery; with a valved pipe 3 for maintaining either a positive or negative pressure, and a valved discharge 4 for drawing off the filtered substance. A dome-shaped cover or top 5, having peripheral flanges 6 and a valved pipe 7 for applying a positive pressure, engages over the top of the body 1.

The membrane 8 (which is shown in solid line since it is too thin to be shown in section-lines) is preferably in the form of a receptacle or thimble-shaped, and has peripheral flange extension adapted to be clamped between the flanges 2 and 6. The support for the membrane is shown at 9. This consists of wire gauze or other foraminous material accurately formed to conform to the outer surface of the membrane 8, and has a flanged periphery adapted to be clamped between the flanges 2 and 6 along with the membrane. Bolting or clamping means (not shown) draw the flanges 2 and 6 to sealed position, and gaskets 10 assist in making the joint fluid tight.

For some uses, where rigid exactitude is not required, the wire gauze 9 may be made of ordinary round-wire, woven in the usual manner; but for relatively absolute exactness and especially where pressure in any appreciable degree is applied, this gauze is woven in the usual manner from round wire, and this woven fabric is then subjected to rolling or hammering until the same is flattened and the wires at the points of crossing are forced down and into each other until the same are, to all intents and purposes, integral and the interstices reduced to very limited size, so that the gauze has a substantially flat, even surface for the support of the membrane 8. Gauze thus formed flat may then be re-formed to receptacle shape, as shown in Fig. 1.

By the use of a support so made there ensues no appreciable physical variation or change in the membrane due to load or pressure, and the ultrafiltration is substantially uniform and absolute.

Figure 3:
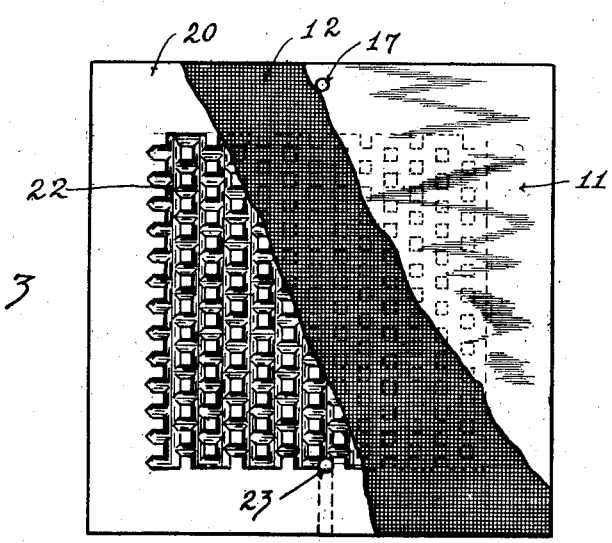
Fig. 3 is a face view of one of my supporting plates, showing also the gauze and membrane thereover.
Figure 2:
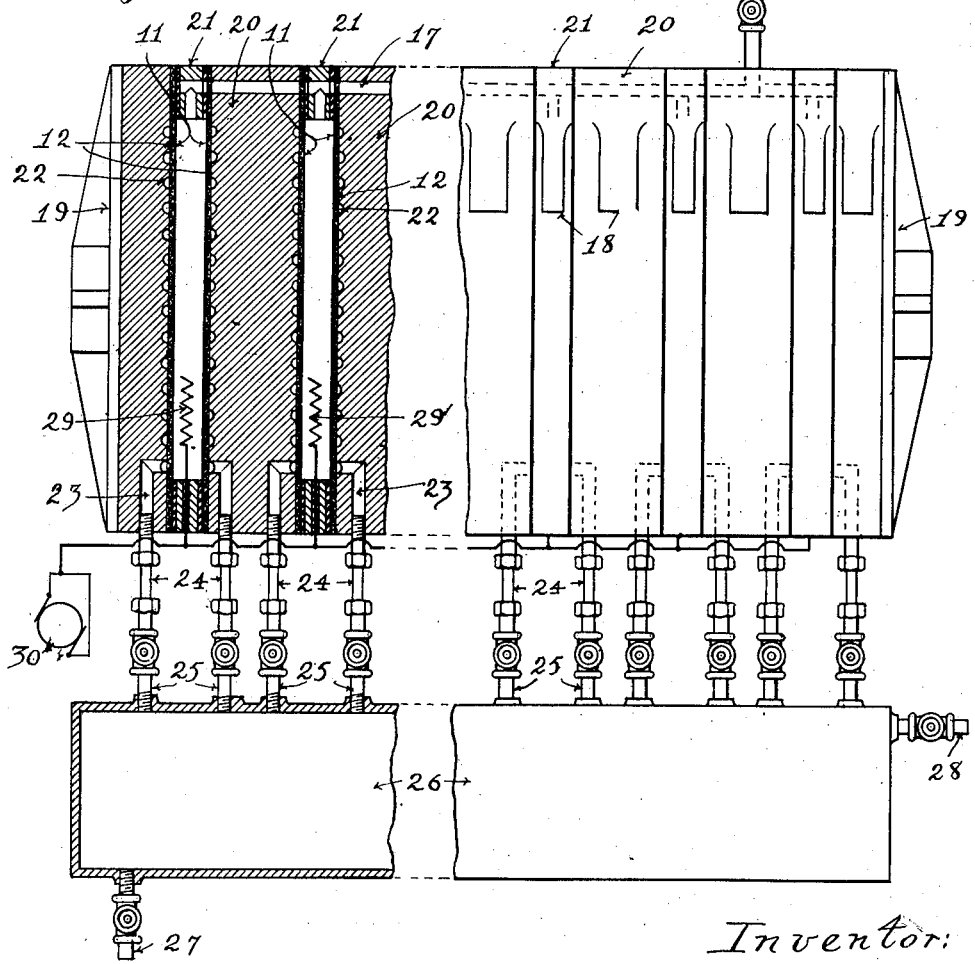
Fig. 2 is a diagrammatic side view, partly in central section, of one form of adaptation of my invention to large or commercial use.

As in the use shown hereafter in connection with Figs. 2 and 3, the membrane may be any porous material, natural or artificial; and I have found that certain metals, aluminum for example, may be made into very thin sheets and used for colloidal filtration. In like manner, I do not limit myself to the described woven gauze, since I may use finely-perforated sheets of metal or metal that is sufficiently porous in character.

And this construction renders possible the following pressure conditions: Through the pipe 7 a pressure in excess of atmospheric pressure may be applied to the ingredient to be filtered, thus hastening the process so that a very short period of time is sufficient to complete the ultrafiltration of a definite quantity; and this is possible because the membrane is uniformly supported. Another method, especially adapted to certain ingredients, is to permit atmospheric pressure to remain upon the charge side, while a negative pressure is established on the discharge side by connecting the valved opening with vacuum-producing means. Again, by pump connection with the valved openings 3 and 7, a positive differential pressure may be established.

The operation with the structure as shown in Fig. 1 is as follows: The receptacle formed by the members 8 and 9 being filled with the substance to be filtered by pouring the same in through the valved opening 7, with the valve 4 closed, the filtration may be effected by any of the following ways: First, by opening the valve 3 to atmosphere and applying pressure on the positive side through the valve 7. Second, by having the valve 7 open to atmosphere and establishing a vacuum effect on the negative or discharge side by connecting the valved connection 3 with any desired sort of vacuum pump. Third, applying pressure through 7 on the positive side and a vacuum effect through 3 on the negative side. Under any of said conditions the substance will be forced through the membrane 8 while the same is held rigidly by the support 9, thus producing a much more effective and rapid result. The filtration completed, the filtered substance which has fallen into the receptacle 1, is drawn off at the valve 4, vent being given by opening the valve 3.

In general, the advantages of such adaptations will be evident to those skilled in the art, but the following is to be stated: I have found that, with certain ingredients the use of a negative pressure upon the discharge side produces what may be regarded as a reduction of pressure upon the particles of the membrane upon that side. I have also found that, with certain fluids, a differential negative pressure is desirable, and with other fluids a differential positive pressure contributes to desired results.

Referring now to Figs. 2 and 3, I will describe the next feature of my invention and the application of the above features thereto. The figures show my invention applied to a commercial or large-capacity filter. In my construction I follow, as nearly as may be, the standard forms of multiple primary or ordinary filters. Hence such elements as the frame, supports, and means for compressing the units, or pressure or vacuum pumps need not be illustrated or described in detail.

The membranes are shown at 11, in solid lines as they are too thin to be shown in section. The flattened wire gauze is shown at 12. The supply tank 13, having a valved inlet 14 for the substance and a valved pipe 15 for supplying positive or negative pressure, connects with the ultrafilter through a valved pipe 16 entering one of the plates and connecting with a distributing passage 17 leading to all of the containing areas. The supporting plates 20 and the spacing plates 21 are carried on a frame (not shown) by lugs 18, and end-plates 19 force the units together by well-known compression means.

The plates 20 are grooved, or channeled, or embossed as indicated at 22, and clearly shown in Fig. 3. This grooving, channeling, or embossing may be of any desired form so long as the supporting portions or parts present flat and substantial surfaces to the gauze 12, and the width of the grooves or channels are such that sagging or bending of the gauze under any pressure condition required will not occur; for such bending or sagging, as already indicated, would result in physical change in the membrane 11 and consequent change in the filtration.

It will be understood that the plates 21 are open rectangles, and between their faces and the corresponding margins of the plates 20 the membranes and gauze are clamped and rendered fluid tight by proper gaskets.

Leading from the lowermost portions of the grooves or channels 22 are discharge channels 23, which in turn lead to sight glasses 24, which glasses lead to valved pipes 25 which discharge into the closed tank 26. The tank 26 has a valved draw-off 27 and a valved pipe 28 by means of which pressure, positive or negative, may be applied to the tank 26. Instead of or in addition to the sight glasses 24, I may provide each discharge pipe with a pet-cock, properly arranged to draw off passing fluid, so that samples of the product may be examined at any time.

Leading into the several fluid areas are heating means by which the fluid may be heated before ultrafiltration. This means is shown as heating-coils 29 which take electric energy from a generator 30. This form of heating is illustrative only. Steam-coils, steam-jackets, or proper preheating means may be employed.

It will now be seen that the membranes 11 are not only supported by the gauze which has been flattened to render the same substantially a plane contacting surface, but they are supported secondarily by the grooved plates 20, so that there is no sagging, bending, or displacement under any condition of pressure that may be employed. And as above stated with reference to the construction of Fig. 1, instead of the described gauze I may use any appropriate form of foraminous material, such as finely-perforated metal sheets, metal sheets which are normally porous, or metallic sheets formed by electro-deposition in well-known manner.

The operation may be described briefly. Assume that it is desired to filter a fluid by applying pressure to the charge side in excess of atmospheric pressure: The tank 13 being charged with the fluid and the valve of the pipe 14 being closed (and the valved pipe 30 leading into the tank 13ª being closed at all times excepting when said tank 13ª is being filled as hereafter described) pressure is put on the fluid by a pressure-pump connected to the pipe 15. The valves in the pipes 16, 25 and 28 are opened. The fluid then flows through the passage 17 to the membranes and the air pressure is, of course, applied to the fluid at its contacting points with the membranes. The normal tendency of these membranes to yield under pressure is precluded by the gauze 11 and the supporting plates 12. The disperse medium passes through the membranes, while the disperse phase is held in the areas on the charge sides. The disperse medium flows through the channels 22 and through the exits 23 and thence through the sight glasses 24 and finally into the tank 26.

As the fluid flows through said glasses, its character and rate of flow may be observed, or if pet-cocks are used, it may be further examined from time to time; and if for any reason any unit fails to operate properly, the valve in the pipe 25 leading from such unit may be closed and the ultrafiltration continued without interruption.

Again, if it is desired to conduct the process under negative pressure, the desired degree of vacuum effect is applied to the tank 26 through a vacuum-pump connecting with the pipe 28, while atmospheric pressure is admitted to the fluid on the charge side by opening the valve in the pipe 15 or the filling pipe 14.

Again, assume that it is desired to treat a fluid by heat and a differential pressure: The coils 29 would be heated to raise the temperature of the fluid, or the temperature otherwise raised as described, while a definite pressure in excess of atmospheric pressure would be applied through the pipe 15, and a positive, but lower pressure, applied to the tank 26 through the pipe 28. Under these conditions the viscosity of the fluid is reduced and the speed of ultrafiltration materially increased, while the pressure applied to the disperse medium will prevent its vaporization. Subsequent cooling of the disperse medium in the tank 26 permits removal in normal state.

There are certain conditions where it is desirable to subject the ingredient to be treated to ordinary or primary filtering immediately before ultrafiltration and before any physical or chemical change can occur. To illustrate how this may be done in coaction with my ultrafilter, I have shown in Fig. 2 an extension of the tank 13 at 13ª, and a partition filter 31 of any desired primary filter material, and a valved inlet 32. A substance in the tank 13ª will be deprived of its content removable by an ordinary filter in passing into the tank 13, and goes then directly to the ultrafilter. This not only materially reduces the deposit in the ultra-filter, but with certain ingredients which change in character with time or with exposure to air, this provision is of special advantage.

From these typical and illustrative uses, other uses of the apparatus are inferable and adaptable by one skilled in the art.

Having thus described my invention and its method of operation, what I claim is:

1. In an ultrafilter, the combination with a filter body, of a membrane, a foraminous support for said membrane formed to fit closely to the discharge side of said membrane and having its surface contacting said membrane made smooth and even to prevent distortion of said membrane under pressure, means for supporting said membrane and said supporting body, and means for maintaining pressure upon the charge side of said membrane in excess of that upon the discharge side.

2. In an ultrafilter, the combination with a filter body adapted to the application of membrane pressures other than atmospheric pressure, of a membrane adapted to receive a substance to be filtered, a support for said membrane comprising a woven-wire fabric which has been given a substantially flat, smooth surface to contact said membrane and formed to conform to the discharge side of said membrane, means for supporting said fabric and means for applying a positive or negative pressure to said membrane.

3. An ultrafilter comprising a filter body closed upon its charge and discharge sides, charging and pressure connections upon its charge side and discharge and pressure connections upon its discharge side, a colloidal membrane, a support for said membrane comprising a closely-woven, fine-wire fabric, the surface of which has been rendered smooth and flat by compression of the wire mesh, and a backing for said support consisting of a grooved or embossed plate adapted to support said wire-woven fabric and also to educt the substance filtered, means for rigidly holding said membrane, said support and said backing, and means for maintaining pressure upon the charge side of said membrane in excess of that upon the discharge side.

4. In an ultrafilter, the combination with filter units and means for supporting and clamping the same together, of a supply tank and means for applying positive or negative pressure to said tank, a discharge tank and means for applying positive or negative pressure to said tank, colloidal membranes, porous supports for said membranes having substantially smooth contacting surfaces and very small apertures, supports for said first-mentioned supports adapted to hold the same rigidly and having channels adapted to receive and carry to discharge the filtered substance, discharge openings and connections therefrom to said discharge tank.

5. In an ultrafilter, the combination with filter units adapted to the application of pressures other than atmospheric pressure and means for establishing and maintaining such pressures, positive or negative, of colloidal membranes, contacting supports on the discharge sides of said membranes consisting of woven-wire gauze which has been flattened to present a smooth contacting surface to said membrane and to reduce the openings in said gauze, grooved or channeled supports for said gauze and discharge channels in said supports, whereby said membranes are held against pressure action and whereby said gauze will sustain high pressures.

6. In an ultrafilter, the combination with a filter body, of a rolled or hammered wire gauze in which the adjacent and crossing wires lie in approximately the same plane, means for supporting said gauze and a colloidal membrane resting upon and supported by said gauze, a plate for supporting said gauze provided with passages to permit the discharge of the filtered substance and differential pressure means for making the pressure upon the charge side greater than that upon the discharge side.

JUSTIN F. WAIT.